(12) United States Patent
Martin

(10) Patent No.: US 9,368,141 B2
(45) Date of Patent: Jun. 14, 2016

(54) PLASTIC CRITICAL TOLERANCE FIT COMPONENT

(75) Inventor: Stephen R. Martin, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 58 days.

(21) Appl. No.: 13/620,143

(22) Filed: Sep. 14, 2012

(65) Prior Publication Data

US 2013/0058600 A1    Mar. 7, 2013

Related U.S. Application Data

(63) Continuation of application No. 11/880,419, filed on Jul. 19, 2007, now abandoned.

(51) Int. Cl.
G11B 17/04     (2006.01)
G11B 5/55      (2006.01)
G11B 25/04     (2006.01)

(52) U.S. Cl.
CPC ............ *G11B 5/5526* (2013.01); *G11B 25/043* (2013.01)

(58) Field of Classification Search
CPC . G11B 19/2009; G11B 5/5526; G11B 25/043
USPC ................................. 360/98.07, 99.04, 99.08
See application file for complete search history.

(56) References Cited

U.S. PATENT DOCUMENTS

| | | | |
|---|---|---|---|
| 5,160,866 A * | 11/1992 | Hishida et al. | 310/90 |
| 5,877,918 A * | 3/1999 | Katakura et al. | 360/99.08 |
| 5,894,382 A * | 4/1999 | Hyde | 360/265.6 |
| 6,757,132 B1 * | 6/2004 | Watson et al. | 360/99.12 |
| 2003/0156353 A1 * | 8/2003 | Gredinberg et al. | 360/99.08 |
| 2007/0211375 A1 * | 9/2007 | Iguchi et al. | 360/99.08 |

* cited by examiner

*Primary Examiner* — Gustavo Polo

(57) ABSTRACT

Accurately formed critical tolerance fit components are provided for fluid dynamic bearing motors, including disc drive memory systems. In an aspect, critical tolerance fit components are molded to a metal insert and include a portion of a hub, a disc seating surface, and a disc locating surface. The insert includes another portion of a hub, a sleeve, or a disc clamp retainer for a novel disc clamp. In an aspect, the plastic component is situated to cause the thermal expansion of the plastic to be restricted by the thermal expansion of a metal insert. Expensive machining of a stamped metal hub is minimized or eliminated by using the molded component portions. Strict component tolerances are provided as needed for perpendicularity relative to motor rotation for seating a disc with accurate flatness, a circumferential surface for centering the disc, and tight parallelism between a disc mounting surface and a center shaft.

18 Claims, 5 Drawing Sheets

PLASTIC CRITICAL TOLERANCE FIT COMPONENT

CROSS-REFERENCE TO RELATED APPLICATION

This application is a continuation of application Ser. No. 11/880,419, filed Jul. 19, 2007.

BACKGROUND

Disc drive memory systems store significant amounts of digital data that is recorded on a relatively small area of concentric tracks of a magnetic disc medium. Several discs are rotatably mounted on a spindle, and the information, which can be stored in the form of magnetic transitions within the discs, is accessed using read/write heads or transducers. A drive controller is conventionally used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor is known as an in-hub or in-spindle motor, which typically has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

Over the years, storage density has increased, and the size of the storage system has tended to decrease. This trend has lead to greater precision and lower tolerance in the manufacturing and operating of magnetic storage discs. For example, to achieve increased storage densities, the read/write heads must be placed increasingly close to the surface of the storage disc. This proximity requires that the disc rotate substantially in a single plane. A slight wobble or run-out in disc rotation can cause the surface of the disc to contact the read/write heads, possibly damaging the disc drive and resulting in loss of data. This is known as a "crash" and can damage the read/write heads and surface of the storage disc, resulting in loss of data. This out-of-flat condition can also create a variation in spacing between the head and disc during reading or writing operations, which also creates a reduction in data integrity.

Spindle motors have in the past used conventional ball bearings between the sleeve and the shaft. However, the demand for increased storage capacity and smaller disc drives has led to the design of higher recording area density such that the read/write heads are placed increasingly closer to the disc surface. Because satisfactory rotational accuracy cannot be achieved using ball bearings, disc drives currently utilize a fluid dynamic bearing between a shaft and sleeve to support a hub and the disc for rotation. An alternative bearing design is a hydrodynamic bearing.

In a hydrodynamic bearing, a lubricating fluid such as gas or liquid provides a bearing surface between a fixed member of the housing and a rotating member of the disc hub. Hydrodynamic bearings spread the bearing surface over a large surface area, as opposed to a ball bearing assembly, which comprises a series of point interfaces. This is desirable because the increased bearing surface reduces wobble or run-out between the rotating and fixed members, decreasing fragility and improving integrity of the motor. Further, the use of fluid in the interface area imparts damping effects to the bearing, which helps to reduce non-repeat run-out. The hydrodynamic bearing motor design is desirable for its improved angular stiffness and dynamic performance; however, manufacturing of motor components can be costly. Stringent performance requirements on current hydrodynamic bearing motor designs require tight component tolerances, often necessitating expensive secondary machining of components.

SUMMARY

The present invention provides a method of forming a critical tolerance fit component for a fluid dynamic bearing motor. A fluid dynamic bearing motor having a plastic portion critical tolerance fit component is also provided. A hydrodynamic bearing is defined between an inner component and an outer component, wherein the inner component and the outer component are positioned for relative rotation. The method comprises situating an insert in a predetermined orientation in a molding device, wherein the insert is a portion of the fluid dynamic bearing motor. Raw material is introduced into the molding device. The raw material is molded into a predetermined form as defined by a cavity, wherein the predetermined form is the critical tolerance fit component fixed to the insert. The cavity is at least defined by a surface of the insert and an inside surface of the molding device. The insert and the critical tolerance fit component are separated from the molding device.

These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
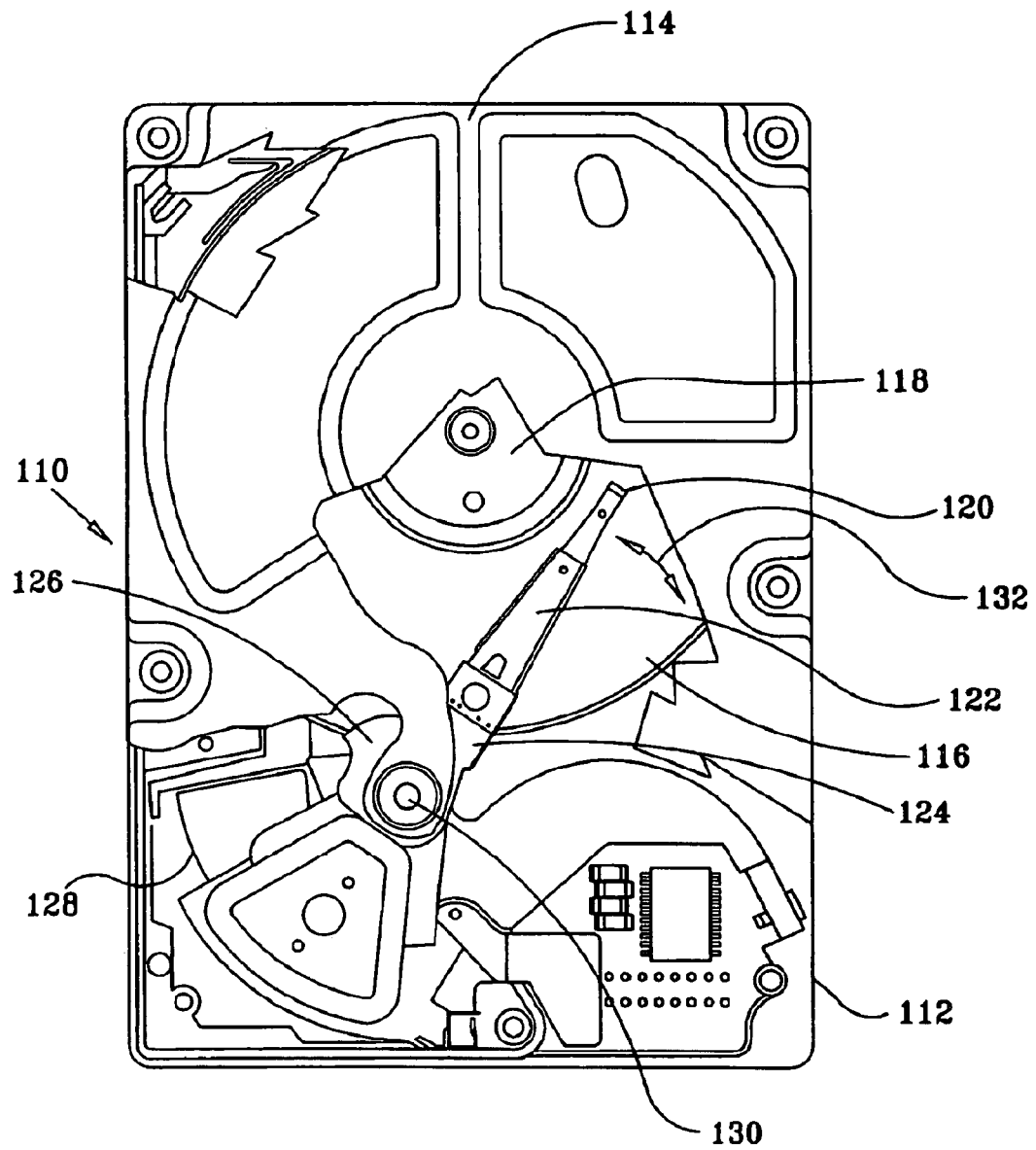
FIG. 1 is a top plan view of a contemporary disc drive data storage system in which the present invention is useful, in accordance with an embodiment of the present invention.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

The present invention provides accurately formed critical tolerance fit components for disc drive memory system motors, low profile disc drives, and various other fluid dynamic bearing motors including hydrodynamic and hydrostatic motors, as well as other motors having conical designs. The critical tolerance fit components include a disc seating surface, a disc locating surface and a portion of a hub. In an embodiment, the cost of fabricating a fluid dynamic bearing motor is reduced by minimizing or eliminating hub assembly tooling by providing tightly aligned component features. In an embodiment, the hub is stamped from metal, thus providing structural stiffness at a fraction of the cost of a machined hub, and expensive secondary machining of the stamped hub is minimized or eliminated. Strict component tolerances are provided by the methods described herein for molding components. The strict component tolerances are useful for various functions including providing a flat surface and perpendicularity for seating a disc with accurate flatness, a circumferential surface for centering the disc, and tight parallelism between the disc mounting surface and a center shaft. Limitations of plastics can be avoided, including the thermal expansion coefficient of the plastic being higher than disc media, as well as thick plastic shrinkage. Further, components can be aligned and attached without the need for adhesives or separate assembly fixturing.

It will be apparent that features of the discussion and claims may be utilized with disc drives, low profile disc drive memory systems, spindle motors, various fluid dynamic bearing motor designs including hydrodynamic and hydrostatic bearing motors, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 402 of shaft 330 shown in FIG. 4 infra), and "radially" or "radial direction" refers to a direction perpendicular to the centerline length of the shaft 330. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

Referring to the drawings wherein identical reference numerals denote the same elements throughout the various views, FIG. 1 illustrates a top plan view of a contemporary disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2 infra) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
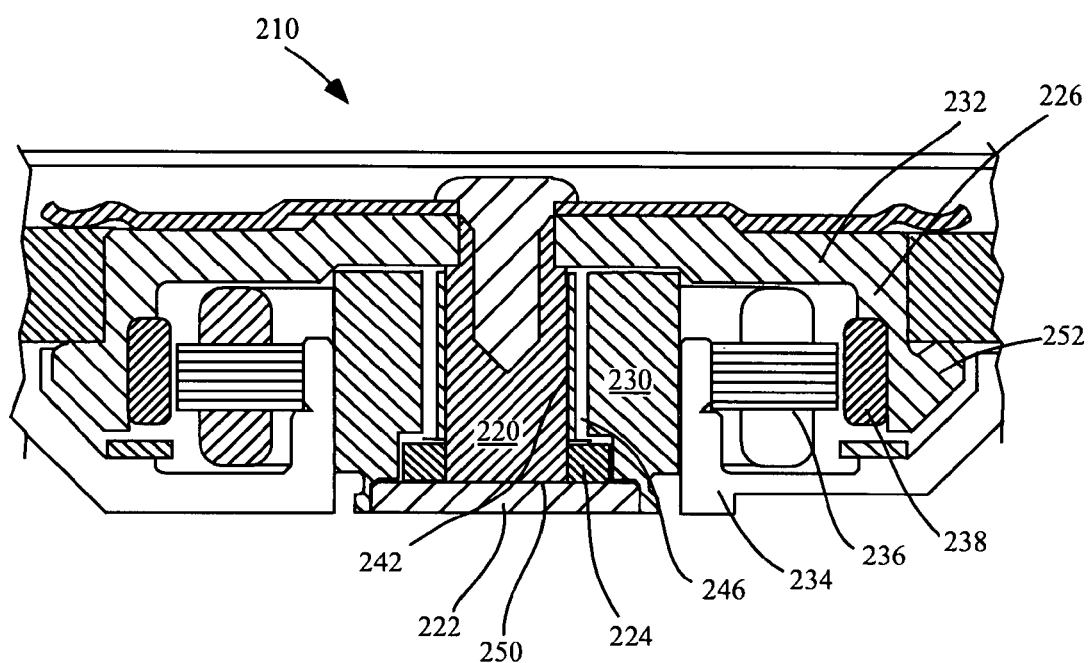
FIG. 2 is a sectional side view of a contemporary hydrodynamic bearing motor used in a disc drive data storage system, in which the present invention is useful.

Referring to FIG. 2, a sectional side view is illustrated of a contemporary hydrodynamic bearing spindle motor as used in a disc drive data storage system 110, in which the present invention is useful. The fluid dynamic bearing motor includes a stationary component and a rotatable component that is relatively rotatable about the stationary component, defining a journal bearing 242 therebetween. In this example, the rotatable components include shaft 220, thrust plate 224, and hub 232. The hub 232 is mounted to shaft 220 with which it rotates. On one end of shaft 220 is thrust plate 224. Thrust plate 224 can be an integral part of shaft 220, or can be a separate piece that is attached to shaft 220, for example, by a press fit. Further, thrust plate 224 is positioned adjacent to counterplate 222 at interface 250. Counterplate 222 is press fitted to or otherwise supported by sleeve 230. Counterplate 222 provides axial stability for the hydrodynamic bearing and positions sleeve 230 within fluid dynamic bearing motor 210. Together, counterplate 222 and sleeve 230 seal an end of the hydrodynamic bearing, namely at interface 250.

Hub 232 includes a disc carrier member 252, which supports disc pack 116 (shown in FIG. 1) for rotation about shaft 220. Shaft 220 and hub 232 additionally are affixed to backiron 226 and magnet 238. One or more magnets 238 are attached to a periphery of backiron 226. The magnets 238 interact with a stator winding 236 attached to the base 234 to cause the hub 232 to rotate. Magnet 238 can be formed as a unitary, annular ring or can be formed of a plurality of individual magnets that are spaced about the periphery of hub 232. Magnet 238 is magnetized to form one or more magnetic poles. The stationary components include sleeve 230 and stator 236, which are affixed to base plate 234. A fluid dynamic journal bearing 242 is established between the sleeve 230 and the rotating shaft 220.

A fluid, such as lubricating oil or a ferromagnetic fluid fills interfacial regions between shaft 220 and sleeve 230, thrust plate 224 and sleeve 230, thrust plate 224 and counterplate 222, as well as between other stationary and rotatable components. While the present figure is described herein with a lubricating fluid, those skilled in the art will appreciate that useable fluids include a lubricating liquid or gas. Also, typically one of shaft 220 and sleeve 230 includes sections of pressure generating grooves, including asymmetric grooves and symmetric grooves. Asymmetric grooves and symmetric grooves may have a pattern including one of a herringbone pattern and a sinusoidal pattern inducing fluid flow in the interfacial region and generating a localized region of dynamic high pressure and radial stiffness. As shaft 220 rotates, pressure is built up in each of its grooved regions and shaft 220 supports hub 232 for constant rotation. A fluid recirculation path 246 is additionally formed through sleeve 230 to pass and recirculate fluid through journal bearing 242, and also to facilitate purging air from journal bearing 242.

Figure 3:
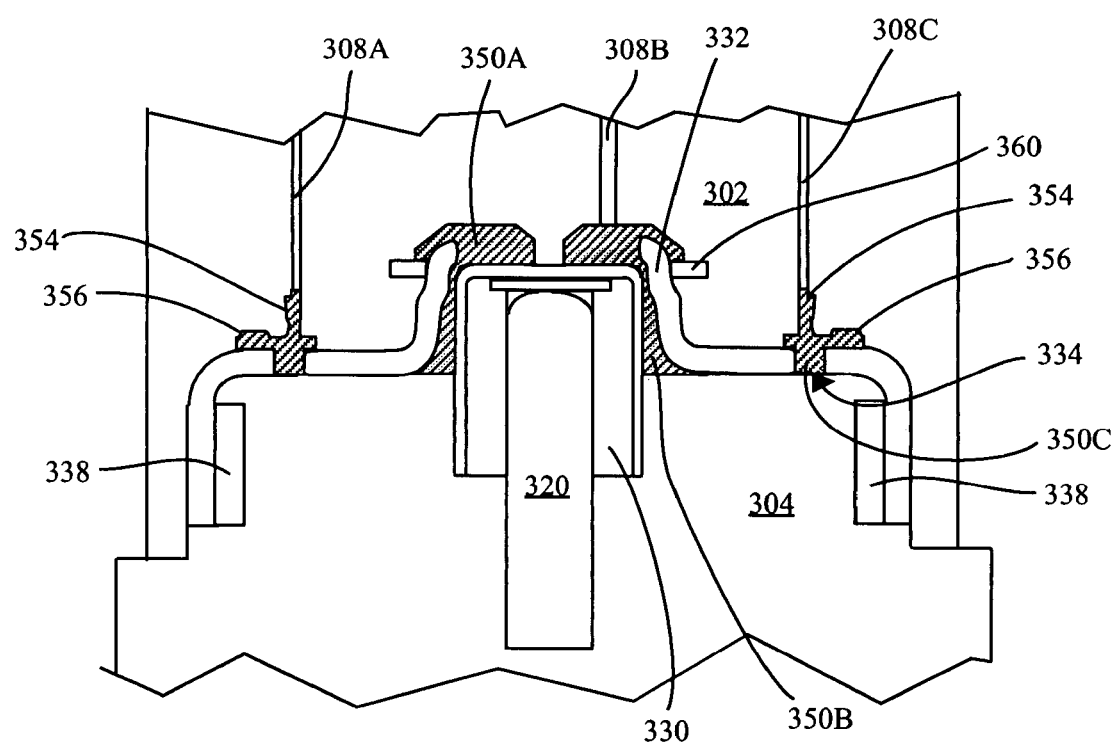
FIG. 3 is a sectional side view of an insert (i.e., hub, sleeve, or disc clamp retainer) situated in a molding device, and a raw material introduced into the molding device forming a critical tolerance fit component (i.e., disc seating surface, disc locating surface, or a portion of the hub), in accordance with an embodiment of the present invention.

FIG. 3 is a sectional side view of a molding device containing an insert, and a raw material introduced into the molding device forming a critical tolerance fit component fixed to the insert, in accordance with an embodiment of the present invention. The insert includes hub 332, sleeve 330, and disc clamp retainer 360, as well as magnet 338 and shaft 320. In an embodiment, the raw material is a plastic, such as Ultem and poly-phenylene sulfide (PPS). The critical tolerance fit components include molded hub portion 350A, molded hub portion 350B, and molded hub portion 350C, as well as molded disc seating surface 356, and molded disc locating surface 354.

In an embodiment, at least a portion of the insert hub 332 is formed by stamping from a metal material (i.e., steel), thus providing structural stiffness at a fraction of the cost of a machined hub. The raw material that is formed into a critical tolerance fit component is fixed to the insert, and expensive secondary machining of the stamped hub is minimized or eliminated.

The insert is situated in a predetermined orientation in the molding device, and raw material is injected into the molding device to a cavity via channels 308A, 308B and 308C. The method may use an injection moulding process. The raw material is molded into a predetermined form (a critical tolerance fit component) as defined by the cavity. The cavity is used to obtain a desired perpendicularity and a flatness for the critical tolerance fit components. The cavity is at least defined by a surface of the insert and an inside surface of the molding device. In another embodiment, the cavity is further defined by an opening or a through-hole 334 within hub 332, and the raw material is fixed to the hub 332 within the opening or through-hole 334.

In an embodiment, the raw material is molded adjacent to, and affixed to, hub 332, sleeve 330 or disc clamp retainer 360. In this example, the molded hub portion 350A is affixed to a portion of hub 332. The molded hub portion 350B is affixed to both an outer diameter of sleeve 330 and a portion of hub 332. Additionally, the thermal expansion of the plastic may be positioned such that it is restricted by a thermal expansion of the insert. As an example, the molded hub portion 350C is situated within, and restricted by, hub opening or through-hole 334. The molded disc seating surface 356 is affixed to a portion of hub 332 and extends from molded hub portion 350C. The molded disc locating surface 354 extends from molded hub portion 350C.

Finally, the insert and the affixed critical tolerance fit components are separated from the molding device for assembly into a fluid dynamic bearing motor. In this example, the molding device separates into two halves, namely half 302 and half 304 (usually called the core and the cavity) to release and extract the insert and the affixed critical tolerance fit components. The sides of the insert and affixed critical tolerance fit components typically are not parallel with the direction of draw (the direction in which the core and cavity separate from each other), and so are slightly angled with a draft.

Figure 4:
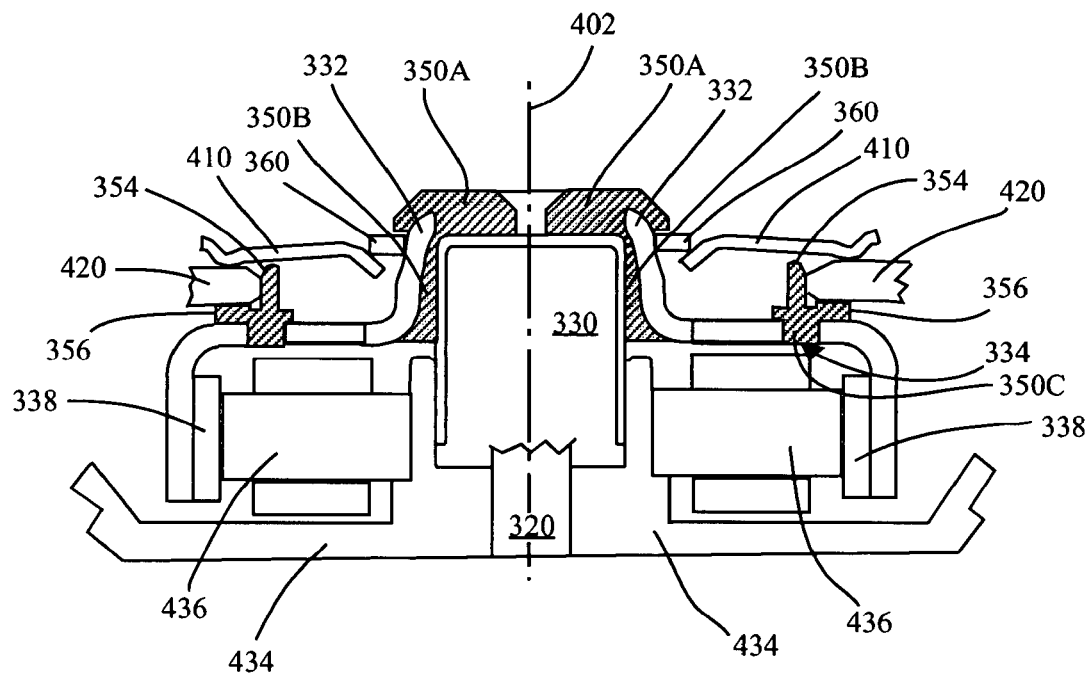
FIG. 4 is a sectional side view of a hydrodynamic bearing motor, illustrating molded critical tolerance fit components (i.e., disc seating surface, disc locating surface, or a portion of the hub), and a disc clamp, in accordance with an embodiment of the present invention.

Turning now to FIG. 4, a sectional side view of a hydrodynamic bearing spindle motor is shown illustrating molded critical tolerance fit components, and a disc clamp, in accordance with an embodiment of the present invention. Similar to the hydrodynamic bearing motor (described in FIG. 2, the fluid dynamic bearing motor shown in FIG. 4 includes a stationary component and a relatively rotatable component, defining a journal bearing therebetween. A magnet 338 interacts with a stator 436 attached to the base 434 to cause the hub 332 to rotate.

The molded critical tolerance fit components shown in this example include molded hub portion 350A, molded hub portion 350B, and molded hub portion 350C, as well as molded disc seating surface 356, and molded disc locating surface 354. Molded hub portion 350A is affixed to a portion of hub 332. Molded hub portion 350B is affixed to both an outer diameter of sleeve 330 and a portion of hub 332. Molded hub portion 350C is situated within, and restricted by, hub opening or through-hole 334. As described above, the thermal expansion of a plastic molded hub portion 350C may be positioned such that it is restricted by a thermal expansion of the surrounding metal hub portion 332. The molded hub portions 350A, 350B and 350C provide strict component tolerances required by a fluid dynamic bearing motor.

The molded disc locating surface 354 extends axially from molded hub portion 350C. Disc locating surface 354 provides an accurate circumferential surface for centering disc(s) 420, and tight parallelism between the disc locating surface 354 and axis 402 of shaft 330. In contemporary designs, clearance between the disc(s) and hub is needed, and the clearance can cause disc slip and disc track misplacement. In the present invention, an interference is created including the disc(s) 420 and the disc locating surface 354 such that the disc(s) 420 remain centered. Additionally, the molded disc seating surface 356 is affixed to a portion of hub 332 and extends radially from molded hub portion 350C. Disc seating surface 356 provides a true flat surface and perpendicularity for seating disc(s) 420 with accurate flatness.

In an embodiment, hub 332, molded hub portion 350A and disc clamp retainer 360 are structured as a "twist and lock" component (shown in FIG. 5, infra) that are rotated and torque down an inner diameter of disc clamp 410 under disc clamp retainer 366. An underside of the outer diameter of disc clamp 410 contacts and retains disc(s) 420 with an axial downward force into disc(s) 420 against disc seating surface 356. The disc locating surface 354 situates the disc(s) 420 radially. Disc clamp 410 is further shown and described in FIG. 6, infra.

Figure 5:
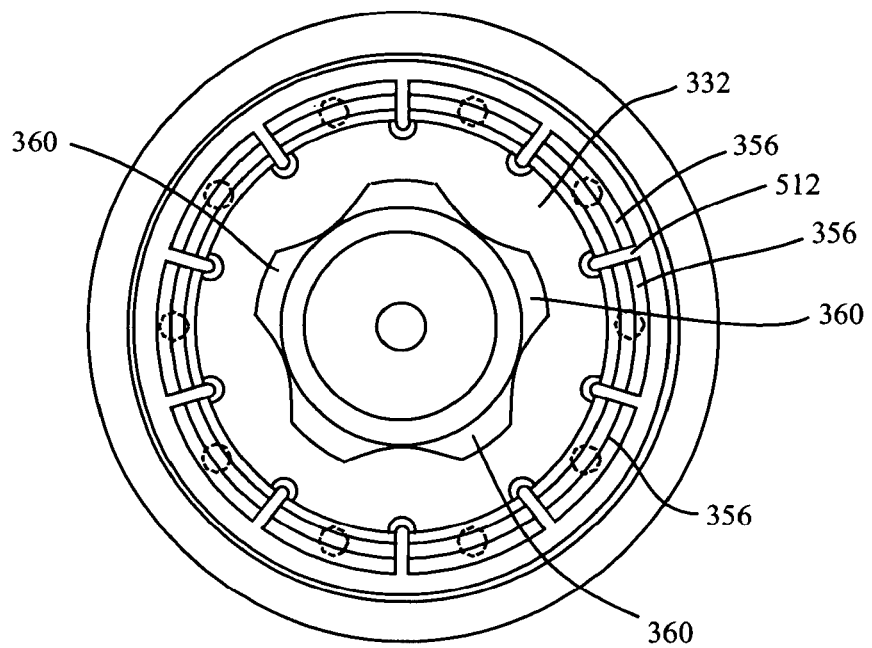
FIG. 5 is a top plan view of a portion of the hub shown in FIG. 4, illustrating one critical tolerance fit component, namely a "twist and lock" hub having a disc clamp retainer, in accordance with an embodiment of the present invention.

A top plan view is illustrated in FIG. 5 of a portion of the hub shown in FIG. 4, illustrating one critical tolerance fit component, namely a "twist and lock" hub having a disc clamp retainer. In contemporary designs, the disc(s) are held by fasteners, and machining of the hub is needed for applying the fasteners. The machining can cause surface rubbing and debris generation that can adversely affect the rotating disc(s). In the present invention, this surface rubbing and debris generation is minimized or eliminated. Hub 332, molded hub portion 350A and disc clamp retainer 360 are rotated and torque down an inner diameter of disc clamp 410 under disc clamp retainer 360.

Additionally, when the annular disc seating surface 356 is formed, it is sectioned into lobes for allowing thermal expansion compliance to the annular disc seating surface 356. In the illustrated example, ten lobes are utilized, with bridges 512 formed between the lobes. Other numbers of lobes and bridges may alternatively be employed.

Figure 6:
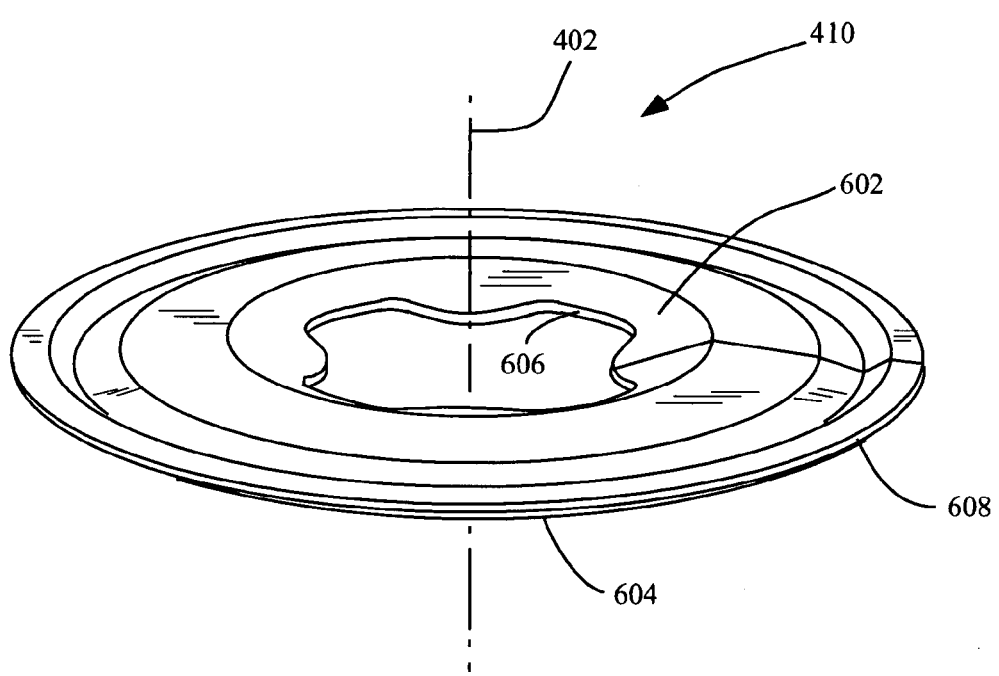
FIG. 6 is a perspective image of a disc clamp for retaining a disc in a disc drive data storage system as in FIG. 4, in accordance with an embodiment of the present invention.

Referring to FIG. 6, a perspective image is shown of a disc clamp 410 for retaining disc(s) in a disc drive data storage system as in FIG. 4. The disc clamp 410 is a radial component situated about axis 402 of shaft 330. Since the disc clamp 410 is a radial component, less force is needed to hold the disc(s) 420 as compared to contemporary fasteners. When situating the disc clamp 410 into a loaded position, an assembly tool or endefector restrains and deflects down an inside diameter 606 of the disc clamp 410. Disc clamp 410 then contacts disc clamp retainer 360 at contact point 602. Another tool corresponds with and restrains the outside diameter 608 of the disc clamp 410. An underside contact point 604 of disc clamp 410 contacts and retains disc(s) 420 with an axial downward force into disc(s) 420 against disc seating surface 356 (shown in FIG. 4).

Modifications and variations may be made to the disclosed embodiments while remaining within the spirit and scope of the invention. The implementations described above and other implementations are within the scope of the following claims.

I claim:

1. An apparatus comprising:
    a stationary component;
    a rotatable component, wherein
        the rotatable component includes a metal portion and a plastic portion,
        the plastic portion is a portion of a disk seating surface or a disk locating surface; and
    a fluid dynamic bearing defined between the stationary component and the rotatable component.

2. The apparatus of claim 1, wherein the plastic portion is fixed to the metal portion.

3. The apparatus of claim 1, wherein the plastic portion is fixed within a through-hole defined by the metal portion.

4. The apparatus of claim 1, wherein the metal portion is steel.

5. The apparatus of claim 1, wherein a thermal expansion of the metal portion is operable to restrict a thermal expansion of the plastic portion.

6. An apparatus comprising:
    a fluid dynamic bearing defined between an inner component and an outer component, wherein the inner component and the outer component are positioned for relative rotation;
    a metal portion of the outer component; and
    a plastic portion of the outer component restricted on two opposite sides by the metal portion of the outer component and another metal component, wherein the plastic portion is fixed to the metal portion, and wherein further a thermal expansion of the metal portion is operable to restrict a thermal expansion of the plastic portion.

7. The apparatus of claim 6, wherein the metal portion includes a first portion of a hub.

8. The apparatus of claim 7, wherein the plastic portion is adjacent to the first portion of the hub.

9. The apparatus of claim 6, wherein the plastic portion is a disk seating surface or a disk locating surface.

10. The apparatus of claim 6, wherein the plastic portion is fixed within an opening defined by the metal portion.

11. An apparatus comprising:
    a bearing defined between a stationary component and a rotatable component, wherein the stationary component and the rotatable component are positioned for relative rotation;
    a metal portion of the rotatable component; and
    a plastic portion of the rotatable component, wherein the plastic portion is a portion of a surface of the bearing.

12. The apparatus of claim 11, wherein the metal portion includes a first portion of a hub.

13. The apparatus of claim 12, wherein the plastic portion is fixed to the metal portion and is adjacent to the first portion of the hub.

14. The apparatus of claim 11, wherein a thermal expansion of the metal portion is operable to restrict a thermal expansion of the plastic portion.

15. The apparatus of claim 1, wherein the metal portion is a stamped metal portion.

16. The apparatus of claim 1, wherein the plastic portion is fixed to the metal portion without adhesive.

17. The apparatus of claim 6, wherein the metal portion is a stamped metal portion.

18. The apparatus of claim 11, wherein the plastic portion is fixed to the metal portion without adhesive.

\* \* \* \* \*